United States Patent
Chan et al.

(10) Patent No.: US 7,878,664 B2
(45) Date of Patent: Feb. 1, 2011

(54) PROJECTOR WITH IMAGE SENSOR

(75) Inventors: Ming-Shan Chan, Taipei Hsien (TW); Sheng-An Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 586 days.

(21) Appl. No.: 11/953,702

(22) Filed: Dec. 10, 2007

(65) Prior Publication Data
US 2009/0040397 A1 Feb. 12, 2009

(30) Foreign Application Priority Data
Aug. 9, 2007 (CN) .................. 2007 1 0201311

(51) Int. Cl.
*G03B 21/28* (2006.01)

(52) U.S. Cl. .............. 353/98; 353/31; 353/37; 353/77; 353/84; 353/94; 353/95; 353/99; 353/119; 353/122; 348/189; 348/383; 348/36; 348/745; 348/747; 348/607; 348/184; 348/190; 348/208.99; 348/751; 359/196.1; 359/197.1; 359/201.2; 359/212.1; 359/223.1; 359/230; 359/237; 359/263; 359/838; 359/865; 345/156

(58) Field of Classification Search .................. 353/31, 353/37, 77, 84, 94, 95, 98, 99, 119, 122; 359/196.1, 197.1, 201.2, 212.1, 223.1, 230, 359/237, 263, 838, 865; 348/383, 189, 36, 348/745, 744, 747, 607, 184, 190, 208.99; 345/156
See application file for complete search history.

(56) References Cited

U.S. PATENT DOCUMENTS

| | | | | |
|---|---|---|---|---|
| 3,894,798 | A * | 7/1975 | Wolf | 353/122 |
| 5,851,060 | A * | 12/1998 | Uchiyama et al. | 353/94 |
| 5,940,204 | A * | 8/1999 | Hewlett | 359/298 |
| 6,310,650 | B1 * | 10/2001 | Johnson et al. | 348/383 |
| 2006/0279662 | A1 * | 12/2006 | Kapellner et al. | 348/744 |
| 2007/0035701 | A1 | 2/2007 | Lee | |
| 2007/0120983 | A1* | 5/2007 | Yamamoto et al. | 348/208.99 |
| 2008/0018591 | A1* | 1/2008 | Pittel et al. | 345/156 |
| 2009/0040397 | A1* | 2/2009 | Chan et al. | 348/751 |

FOREIGN PATENT DOCUMENTS

CN 2714090 Y 8/2005
CN 1983013 A 6/2007

* cited by examiner

Primary Examiner—Georgia Y Epps
Assistant Examiner—Sultan Chowdhury
(74) Attorney, Agent, or Firm—Jeffrey T. Knapp

(57) ABSTRACT

A projector includes a projecting module for projecting a projecting image on a screen panel, an image sensor for capturing an image of an object which is located outside of the projecting module and faces toward the lens module, a light director, and a controlling unit. The projecting module has a lens module and a light source for emitting light transmitting through the lens module. The light director is movable between a first position where the light director is located outside of a light path associated with the lens module, and a second position where the light director is configured for directing light of the object through the lens module to be incident on the image sensor. The controlling unit controls the light director to move between the first and second positions.

17 Claims, 3 Drawing Sheets

PROJECTOR WITH IMAGE SENSOR

BACKGROUND

1. Field of the Invention

The present invention relates to projecting technology, and particularly, to a projector with an image sensor.

2. Description of Related Art

Nowadays, images (image data) projected by a projector are from peripheral devices such as computers and USB (universal serial bus) disks. If people want to show images, they have to use a capturing device (such as a camera) for capturing images, and transmit the captured images from the capturing device to the peripheral device, and then transmit the images from the peripheral device to the projector. In this way, it is inconvenient for people to show the images.

What is needed, therefore, is to provide a projector, in which the above problem is eliminated or at least alleviated.

SUMMARY

The present invention relates to a projector. The projector includes a projecting module for projecting a projecting image on a screen panel, an image sensor for capturing an image of an object which is located outside of the projecting module and faces toward the lens module, a light director, and a controlling unit. The projecting module has a lens module and a light source for emitting light transmitting through the lens module. The light director is movable between a first position where the light director is located outside of a light path associated with the lens module, and a second position where the light director is configured for directing light of the object through the lens module to be incident on the image sensor. The controlling unit controls the light director to move between the first and second positions.

Other advantages and novel features of the present invention will become more apparent from the following detailed description of present embodiments when taken in conjunction with the accompanying drawings, in which:

DETAILED DESCRIPTION OF THE INVENTION

Reference will now be made to the figures to describe the at least one present embodiment in detail.

Figure 1:
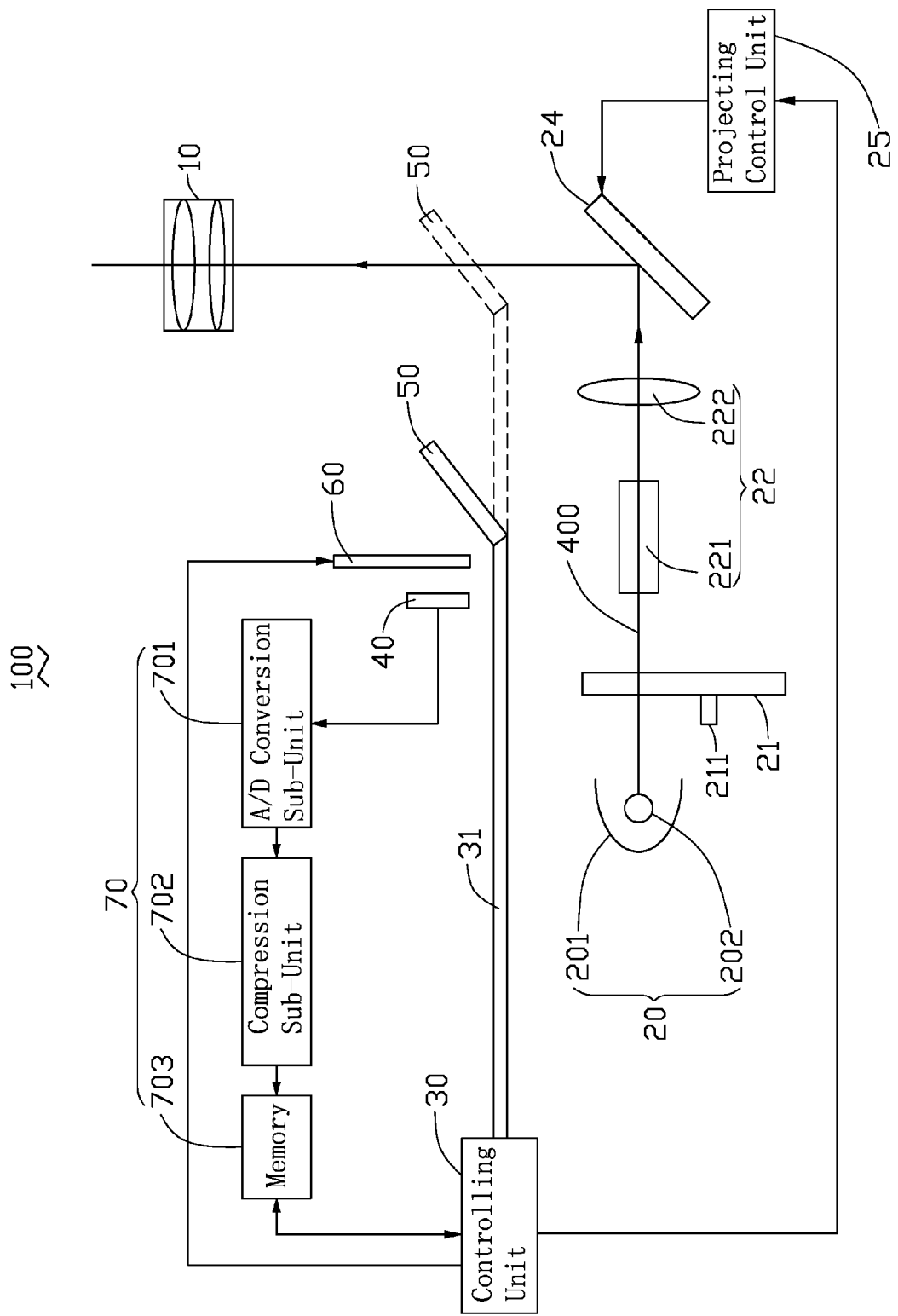
FIG. 1 is a schematic view of a projector in accordance with a present embodiment.

Referring to FIG. 1, a projector 100, in accordance with a present embodiment, is shown. The projector 100 includes a projecting portion, a lens module 10, a controlling unit 30, an image sensor 40, a light director 50, a shutter 60, and an image processing unit 70. As an example, the projector 100 is a digital-light-processing (DLP) projector.

The projecting module includes a light source 20, a color wheel 21, a converging assembly 22, a digital micromirror device (DMD) 24 arranged along a light path 400 of the light source 20 in that order. The projecting module further includes a projecting control unit 25 electrically connected to the controlling unit 30. The projecting control unit 25 controls an operation of the DMD 24.

The light source 20 includes a cover 201 and a light emitting portion 202 received in the cover 201. Beneficially, the cover 201 is an elliptical-shaped cover, and the light emitting portion 202 is positioned at a focal point of the elliptical-shaped cover. Generally, the light emitting portion 202 is a metal halide lamp, a high-voltage mercury lamp, or a white light emitting diode for emitting white light. The color wheel 21 includes a motor 211 and three filter segments (not shown): a red-light filter segment, a green-light filter segment and a blue-light filter segment. The motor 211 drives the filter segments to rotate so as to set the filter segments into the light path 400 alternately. Correspondingly, white light emitted from the light emitting portion 202 is filtered by the filter segments of the color wheel 21 to form red light, green light, and blue light. It is to be understood that a color wheel 21 with more than three filter segments can be applied depending on practical requirements of the projector.

The converging assembly 22 includes an integrator 221 and a condenser 222. The integrator 221 can be a solid integrator or a hollow integrator. The integrator 221 is capable of transforming the light with a radial style emitted from the light source 20 to a light with a parallel style suitable for being incident on the DMD 24. The condenser 222 converges the light emitted from the light source 10 to reduce loss of light energy.

The DMD 24 includes a substrate (not shown) and micromirror arrays (not shown) formed on the substrate. The micromirror arrays of the DMD 24 are controlled by the projecting control unit 25 to modulate and reflect the light from the converging assembly 22 towards the lens module 10. The light modulated by the DMD 24 is projected by the lens module 10 to produce an image on a screen panel (not shown). The lens module 10 includes at least one lens such as two lenses shown in FIG. 1.

The light director 50 is a reflective mirror having a reflective surface or a substrate coated with a reflective film. The light director 50 shown as a real line of the light director 50 in FIG. 1, is alternately positioned out of the light path between the lens module 10 and the DMD 24, e.g., a first position so that the projector 100 can project images, or in the light path between the lens module 10 and the DMD 24, e.g., a second position so that the projector 100 can capture images. When the light director 50 is positioned in the light path between the lens module 10 and the DMD 24, the reflective surface of the light director 50 faces the lens module 10 (described in detail thereafter).

The controlling unit 30 is a chip capable of determining, controlling, computing, executing, and switching. The controlling unit 30 controls the light director 50 to move in or out of the light path 400 between the lens module 10 and the DMD 24 by a linkage mechanism 31 such as a mechanism including a motor and a lever driven by the motor.

The shutter 60 and the image sensor 40 are positioned along/in a reflective light path of the light director 50. The shutter 60 is electronically coupled to the controlling unit 30. Exposure of the image sensor 40 is controlled by the shutter 60. The image sensor 40 includes a charge coupled device (CCD) or a complementary metal-oxide semiconductor (CMOS) to produce captured images by transferring the light (light signals) reflected by the light director 50 incident from the lens module 10 into electrical signals (analog signals).

The image processing unit 70 includes an analog-to-digital (A/D) conversion sub-unit 701, a compression sub-unit 702, and a memory 703. The A/D conversion sub-unit 701 receives the analog signals from the image sensor 40 and converts the analog signals to digital signals. The compression sub-unit 702 receives the digital signals, and compresses and codes the digital signals to image data such as joint photographic experts group (JPEG) image data). The image data is stored in the memory 703.

Figure 2:
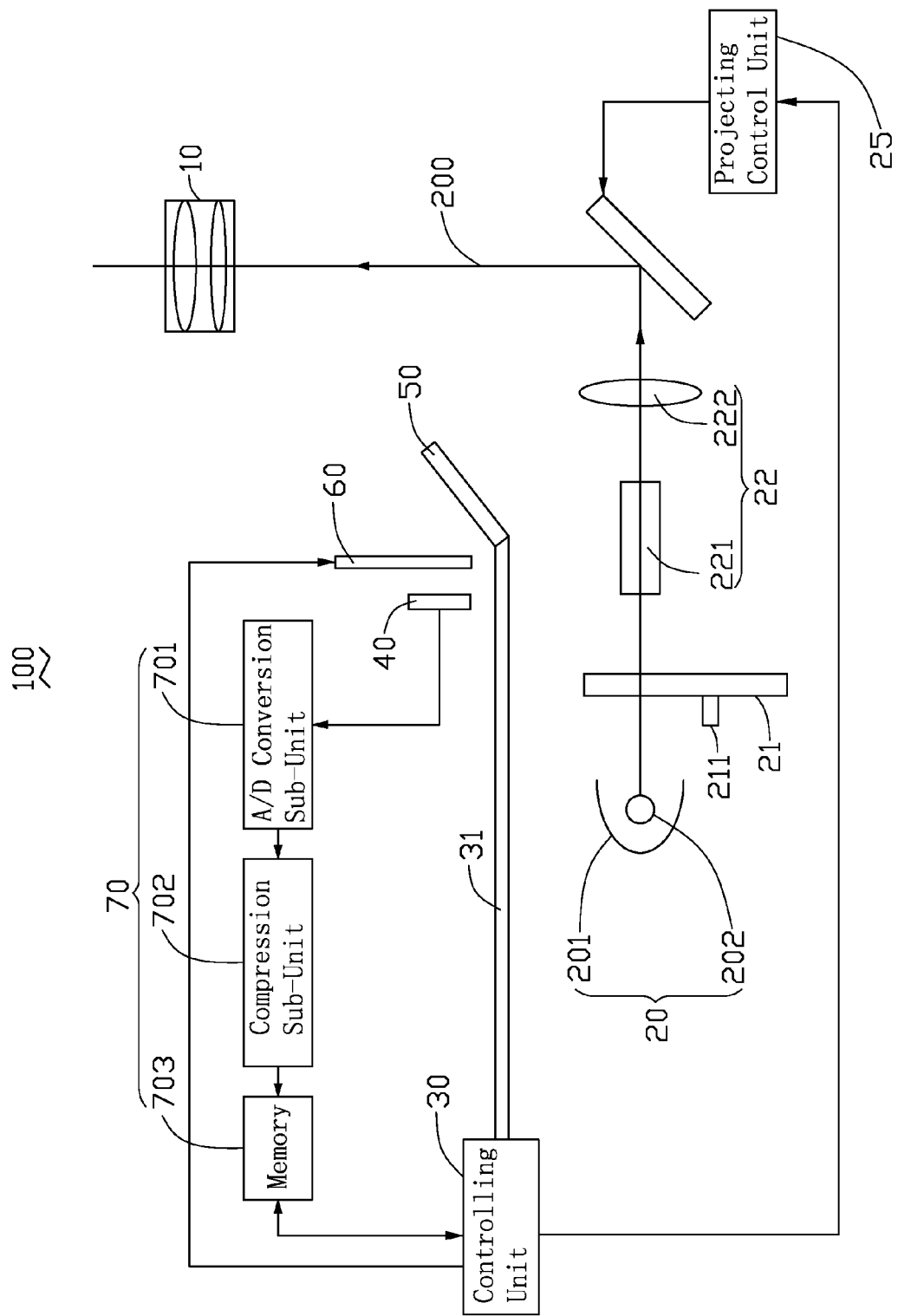
FIG. 2 is similar to FIG. 1, with the projector operating to project images.

Referring to FIG. 2, to project images, the controlling unit 30 moves the light director 50 out of a light path 200 between the lens module 10 and the DMD 24 via the linkage mechanism 31 and controls operation of the projecting portion. That is, the light source 202 emits light towards the DMD 24 via the color wheel 21 and the converging assembly 22, and then is modulated by the DMD 24, which is controlled by the projecting control unit 25. The modulated light is projected by the lens module 10 to produce images on the screen.

Figure 3:
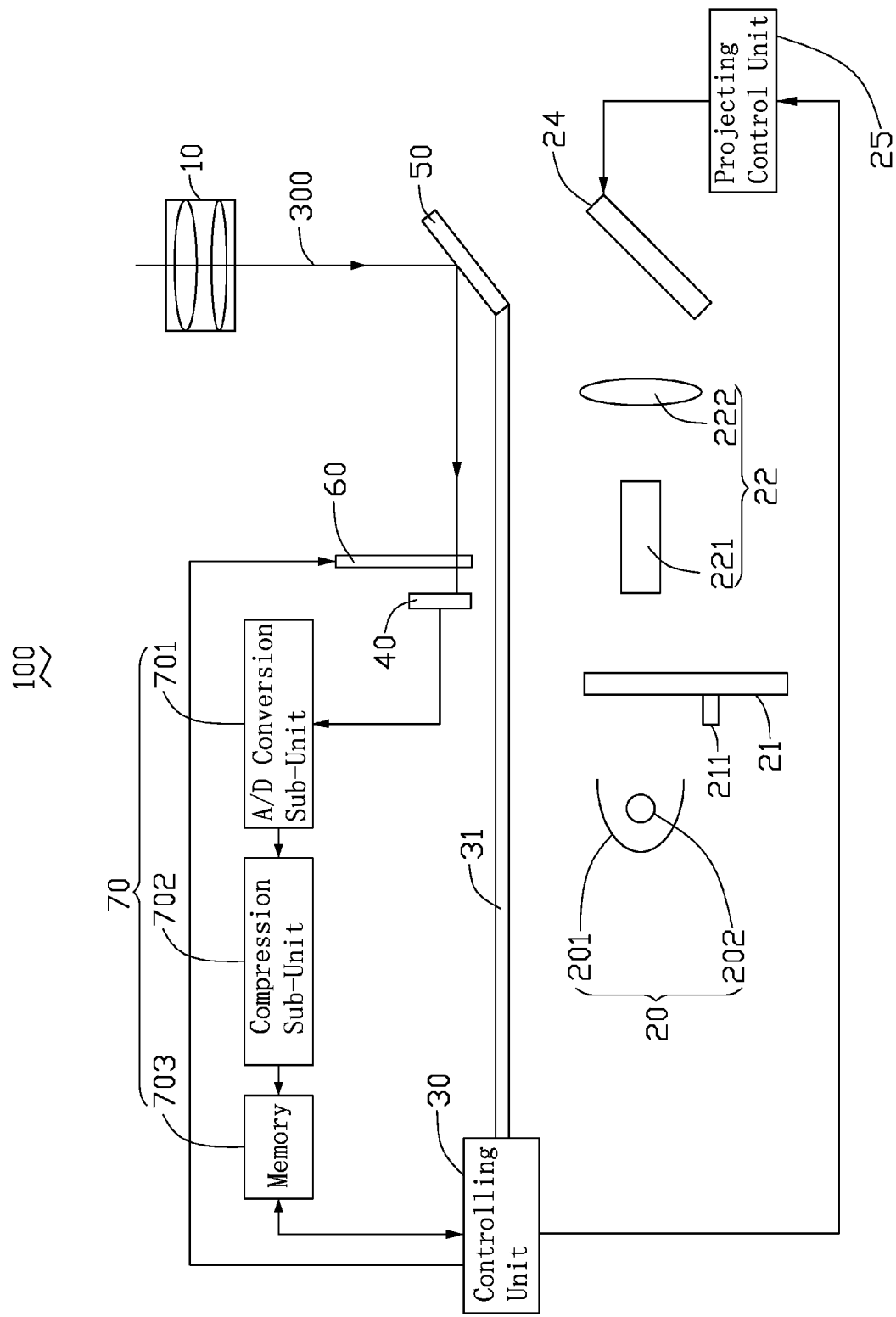
FIG. 3 is similar to FIG. 1, with the projector operating to capture images.

Referring to FIG. 3, to capture images, the controlling unit 30 moves the switch 50 in a light path 300 between the lens module 10 and the projecting module (the DMD 24) by the linkage mechanism 31. Light incident from the lens module 10 is reflected by the light director 50 towards the image sensor 40. The image sensor 40 converts the light (light signals) reflected by the switch 50 into electrical signals (analog signals). The A/D conversion sub-unit 701 converts the analog signals into digital signals. The compression sub-unit 702 compresses and codes the digital signals to produce image data. The image data are stored in the memory 703.

It is to be understood that the image data stored in the memory 703 can be output as a projecting data source. The projecting control unit 25 receives the image data from the memory 703 and controls the light source 10, the color wheel 21, and the DMD 24 to produce projecting images. Alternatively, the projecting data source can also be from peripheral devices.

Movement of the switch 50 in or out of the light path between the projecting module and the lens module 10 is controlled by the controlling unit 30, so the projector 100 is controlled to capture or project images.

For better understanding of the present invention, the DLP projector was used as an example for describing the embodiment of the present invention. However, other projectors such as liquid-crystal-display (LCD) projectors or liquid-crystal-on-silicon (LCOS) projectors can also be applied within the principles of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projector, comprising:
a projecting module for projecting a projecting image on a screen panel, the projecting module having a lens module and a light source for emitting light transmitting through the lens module;
an image sensor for capturing an image of an object which is located outside of the projecting module and faces toward the lens module;
a light director movable between a first position where the light director is located outside of a light path associated with the lens module such that light of the object passed through the lens module is not incident on the image sensor, and a second position where the light director directs the light of the object passed through the lens module to be incident on the image sensor and simultaneously blocks the emitting light from reaching the lens module; and
a controlling unit for controlling the light director to move between the first and second positions.

2. The projector as claimed in claim 1, wherein the light director is a reflective mirror or a substrate coated with a reflective film.

3. The projector as claimed in claim 1, further comprising a shutter positioned between the light director and the image sensor, and electronically coupled to the controlling unit.

4. The projector as claimed in claim 1, further comprising an image processing unit for processing signals from the image sensor.

5. The projector as claimed in claim 4, wherein the image processing unit comprises:
an analog-to-digital conversion sub-unit for converting analog signals into digital signals;
a compression sub-unit for compressing and coding the digital signals to produce image data; and
a memory for storing the image data.

6. The projector as claimed in claim 1, wherein the image sensor includes a charge coupled device or a complementary metal-oxide semiconductor.

7. The projector as claimed in claim 1, further comprising a projecting control unit for controlling operation of the projecting module.

8. The projector as claimed in claim 1, wherein the projecting module includes the light source, a color wheel, a converging assembly, and a digital micromirror device arranged along a light path of the light source in that order.

9. The projector as claimed in claim 1, wherein the projector is a liquid-crystal-display projector, a digital-light-processing projector, or a liquid-crystal-on-silicon projector.

10. A projector, comprising:
a projecting module comprising a light source, a digital micromirror device, and a lens module, the digital micromirror device and the lens module being arranged along a light path of the light source in that order, the light source configured for emitting light transmitting through the lens module;
an image sensor for capturing an image of an object which is located outside of the projector;
a light director movable between a first position where the light director is located outside of a light path between the digital micromirror device and the lens module, and a second position where the light director is located in the light path between the digital micromirror device and the lens module, the light director configured for directing light of the object through the lens module to be incident on the image sensor when the light director is located in the light path between the digital micromirror device and the lens module; and a controlling unit for controlling the light director to move between the first and second positions.

11. The projector as claimed in claim 10, wherein the light director is one of a reflective mirror and a substrate coated with a reflective film.

12. The projector as claimed in claim 10, further comprising a shutter positioned between the light director and the image sensor, and electronically coupled to the controlling unit.

13. The projector as claimed in claim 10, further comprising an image processing unit for processing signals from the image sensor.

14. The projector as claimed in claim 13, wherein the image processing unit comprises:

an analog-to-digital conversion sub-unit for converting analog signals into digital signals;

a compression sub-unit for compressing and coding the digital signals to produce image data; and a memory for storing the image data.

15. The projector as claimed in claim 10, wherein the image sensor includes one of a charge coupled device and a complementary metal-oxide semiconductor.

16. The projector as claimed in claim 10, further comprising a projecting control unit for controlling operation of the projecting module.

17. The projector as claimed in claim 10, wherein the projecting module further comprises a color wheel and a converging assembly, and the light source, the color wheel, the converging assembly, and the digital micromirror device are arranged along the light path of the light source in that order.

* * * * *